United States Patent Office 2,848,499
Patented Aug. 19, 1958

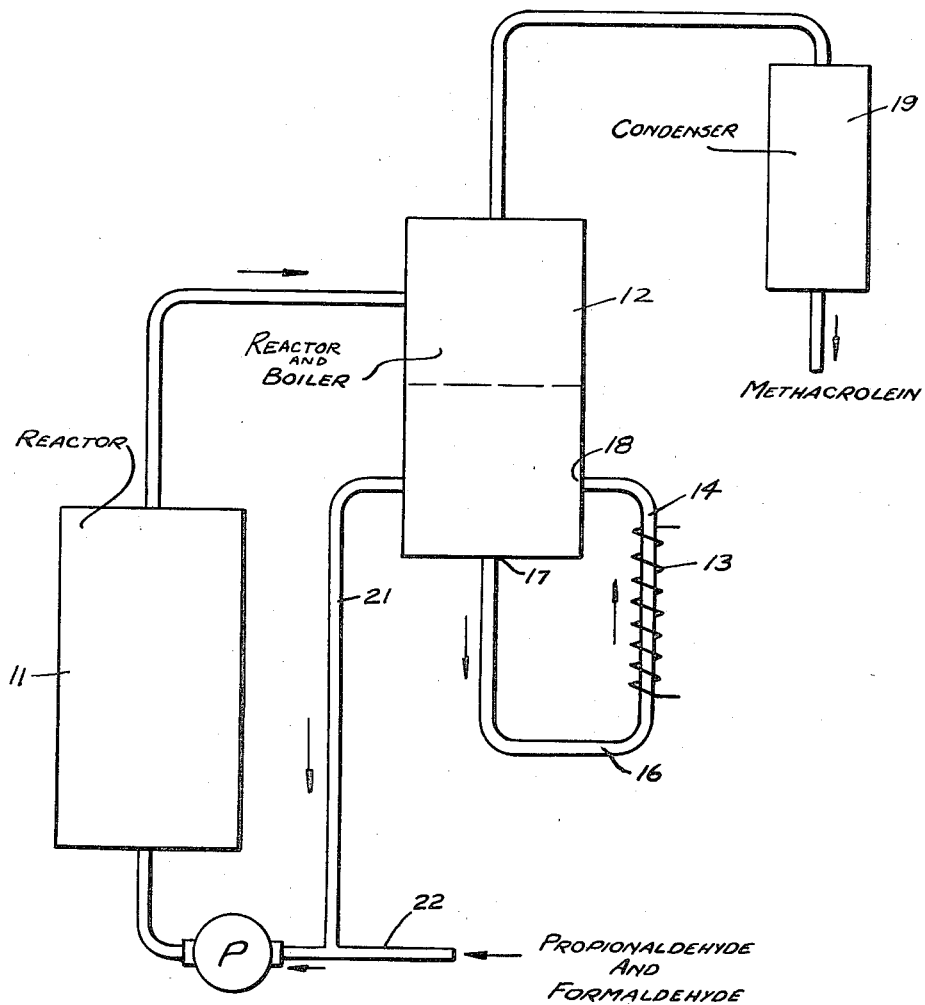

2,848,499

PREPARATION OF UNSATURATED ALDEHYDES

Alexander F. MacLean and Bruno G. Frenz, Corpus Christi, Tex., assignors to Celanese Corporation of America, New York, N. Y., a corporation of Delaware Application May 9, 1956, Serial No. 583,818

11 Claims. (Cl. 260—601)

This invention relates to aldehydes and relates more particularly to the production of unsaturated aldehydes, such as methacrolein, by the reaction of formaldehyde and a higher aldehyde.

One method for the production of methacrolein involves the reaction of a salt of a secondary amine, e. g. dimethylamine hydrochloride, with formaldehyde and propionaldehyde to form a salt of a Mannich base, followed by decomposition of the latter to produce methacrolein and the amine salt, according to the equations:

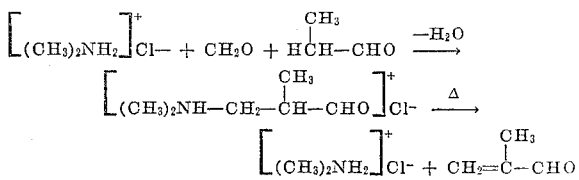

However, in this process the extent of conversion of the reactants and the efficiency and speed of reaction have not been as high as desired.

It is therefore an object of this invention to provide a new and more efficient process for carrying out the reaction of an amine salt, formaldehyde and propionaldehyde to produce methacrolein.

Another object of this invention is the provision of a novel process for the production of unsaturated aldehydes by the Mannich type condensation of an amine salt, formaldehyde and a suitably reactive aldehyde having at least three carbon atoms.

Other objects of this invention will be apparent from the following detailed description and claims. In this description and claims all proportions are by weight unless otherwise indicated.

In accordance with one aspect of this invention, the reaction of formaldehyde, propionaldehyde and a secondary amine salt is carried out continuously in aqueous medium in a reactor under a superatmospheric pressure and at a temperature of about 90 to 120° C. for a period of time sufficient to convert more than 90% of the propionaldehyde to the salt of the Mannich base. The resulting aqueous mixture is withdrawn continuously from the reactor and passed through a second reactor maintained at an elevated temperature, and preferably, at a lower pressure than the first reactor, e. g. at atmospheric pressure. In the second reactor the salt of the Mannich base is decomposed to regenerate an aqueous solution of the secondary amine salt and to form the desired methacrolein, which is boiled off and collected. The aqueous solution of the secondary amine salt is mixed with further quantities of propionaldehyde and formaldehyde and recirculated to the reactor.

The accompanying drawing is a flow sheet of one preferred embodiment of the invention.

Referring now to the drawing, reference numeral 11 designates a heated reactor where propionaldehyde, formaldehyde and the secondary amine salt are reacted continuously in aqueous medium under superatmospheric pressure to form a Mannich base salt. The reaction products are discharged from the reactor 11 into a second reactor and boiler 12, operating at atmospheric pressure. This boiler 12 is of the thermosiphon type in which heat is supplied by a heating coil 13 disposed about one leg 14 of a tube 16, said tube having an inlet 17 and an outlet 18 communicating with the main body of liquid in the boiler 12; the outlet 18 should preferably lead from the vapor space in the upper part of boiler. The inlet 17 is disposed below the outlet 18 so that the liquid at the bottom of the boiler 12 first flows down the tube 16 from the inlet 17 and then is forced upward, together with bubbles produced by the heat of the coil 13, through the heated leg 14. Here the Mannich base salt is decomposed and vapors of a mixture of water and methacrolein are formed. These vapors are removed from the top of the boiler 12 and condensed, in condenser 19, to form a two-phase liquid mixture, from which the water-immiscible methacrolein layer may be separated easily. An aqueous solution of the secondary amine salt is withdrawn continuously from the lower portion of the boiler, through a line 21, and is mixed continuously with fresh feed of propionaldehyde and aqueous formaldehyde which enters through a line 22. The resulting mixture is pumped continuously into the reactor 11.

In the first stage of the reaction; i. e. the formation of the Mannich base salt, best results are obtained when the proportions of propionaldehyde and formaldehyde are about equimolecular and the proportion of the secondary amine salt is in excess of the stoichiometric ratio. Preferably there are used about two to five moles of the secondary amine salt per mole of propionaldehyde or formaldehyde, to insure substantially complete conversion of the reactants.

The first stage of the reaction is advantageously carried out in the presence of a relatively large amount of water, e. g. about 50 to 60% of water, based on the weight of the reaction mixture, and under a superatmospheric pressure sufficient to maintain the reaction mixture including the volatile propionaldehyde in liquid condition. The duration of the first stage of reaction is relatively short, e. g. about 15 minutes when the reaction temperature is about 120° C. and about 25 minutes when it is 90° C., so that very little, if any, decomposition of the Mannich base salt takes place in this stage. Preferably, the reactor used for the first stage of the reaction is of the type in which the reaction mixture passes through in a continuous stream with substantially no back-mixing or internal recirculation.

In the second stage of reaction the temperature may be varied as desired, a temperature of about 105 to 110° C. being most suitable. When this stage is carried out in a boiler type of reactor, such as is shown in the flow sheet in the accompanying drawing, the concentration of the secondary amine salt in the aqueous mixture in the boiler may be kept constant by maintaining said boiler at a constant temperature. For example, the boiling off of water from the aqueous mixture in the boiler will cease when the aqueous mixture becomes so concentrated that its boiling point is above the temperature of the boiler and will resume when the aqueous mixture is diluted by the continuous introduction of the aqueous products of the first stage of reaction. This automatic regulation of the concentration of the recycled mixture is of great aid in control of the continuous process.

For most efficient operation, the residence time of the material in the boiler or other second stage reactor is such that substantially all of the Mannich base salt fed into said reactor becomes decomposed. However, even if some Mannich base salt is recycled to the first stage at the beginning of operations, the amount of salt so recycled quickly becomes constant during operation and all of the Mannich base salt produced by subsequent reaction is decomposed in the second stage. The use of an excess of the amine salt, as described previously, helps to insure this constancy and complete decomposition.

It is desirable to maintain the reaction mixtures used in this invention under an inert atmosphere, such as an atmosphere of nitrogen substantially free of oxygen, i. e. containing no oxygen or only a very small amount of oxygen, for example, less than 1% of oxygen. This helps to avoid polymerization of the methacrolein formed in the reaction.

By the process of this invention methacrolein has been obtained in very high yields and at very high efficiencies. In fact, the reaction proceeds almost quantitatively with practically all of the propionaldehyde being converted to the desired product. The high degree of conversion has the further desirable effect of minimizing the effort necessary to separate unconverted propionaldehyde from the methacrolein in order to purify the product. Moreover, the rate of conversion is high, so that large amounts of methacrolein are produced in short periods using relatively small and economical apparatus.

The following example is given to illustrate this invention further.

*Example*

Aqueous dimethylamine hydrochloride (recycled as indicated below), propionaldehyde and a 36.3% aqueous solution of formaldehyde are mixed continuously to provide a feed stream containing 2.42 moles of dimethylaminehydrochloride and 0.965 mole of propionaldehyde per mole of formaldehyde, the amount of water in said feed stream being 57.2%. The feed stream is fed directly to a reactor maintained at a temperature of 111° C. and under a pressure of 80–90 p. s. i. g. The stream passes through the reactor continuously, without any substantial back-mixing, the residence time of the stream in the reactor being 20 minutes. The products of reaction are discharged from the reactor into a boiler, as illustrated in the drawing, maintained at a temperature of 107° C. The residence time of the liquid in this boiler is 25 to 30 minutes. Vapors of propionaldehyde and water are collected overhead and condensed to form a two phase system, and the organic phase, which contains over 98% of methacrolein and less than 0.5% of propionaldehyde, is separated. A polymerization inhibitor, e. g. hydroquinone, is added to the organic phase. The aqueous 38% solution of dimethylaminehydrochloride formed in the boiler is recycled continuously, together with fresh propionaldehyde and formaldehyde to the first-stage reactor. The entire reaction system is maintained under an inert atmosphere of nitrogen. The extent of conversion of propionaldehyde in the process is 98.1%, and the efficiencies of conversion to methacrolein are 99.6% (based on propionaldehyde) and 99.0% (based on formaldehyde).

While the invention has been illustrated above in connection with reactions involving propionaldehyde and dimethylamine hydrochloride as two of the reactants, it will be understood that it may be applied to the reactions of this type in which other higher aldehydes and other secondary amine salts are reacted with formaldehyde to form Mannich base salts which are then decomposed to form the desired unsaturated aldehydes. Such other higher aldehydes are preferably those in which the alpha carbon atom attached to the carbonyl group is also directly attached to two hydrogen atoms and to another carbon atom, for example to a carbon atom of an alkyl group. Examples of such other higher aldehydes are valeraldehyde and butyraldehyde. Examples of other secondary amine salts which may be used in the process of this invention are salts of piperidine, morpholine, and diisopropylamine with such acids as hydrochloric, sulfuric, phosphoric or acetic, although dimethylaminehydrochloride is preferred.

It is to be understood that the foregoing detailed description is merely given by way of illustration and that many variations may be made therein without departing from the spirit of our invention.

Having described our invention, what we desire to secure by Letters Patent is:

1. In the process of producing an unsaturated aldehyde by the reaction of formaldehyde, another aldehyde of at least three carbon atoms and a salt of a secondary amine and wherein a Mannich base salt is formed by reaction of said aldehydes and said amine salt with splitting out of water, and in which said Mannich base salt is decomposed to form the desired unsaturated aldehyde, the improvement which comprises continuously feeding said aldehydes in about equimolecular proportions together with said amine salt and water to a reaction zone maintained under superatmospheric pressure and at a temperature of about 90 to 120° C., maintaining the resulting mixture in said reaction zone for a period of time sufficient to convert more than 90% of said aldehyde of at least 3 carbon atoms to the Mannich base salt, then passing said mixture continuously into a second reaction zone maintained at an elevated temperature sufficiently high to decompose said Mannich base salt to form by said decomposition an unsaturated aldehyde and an aqueous solution of said amine salt, boiling the mixture in said second zone to drive off said unsaturated aldehyde continuously, and continuously recycling said aqueous solution to said first reaction zone.

2. Process as set forth in claim 1 in which about 2 to 5 moles of said amine salt per mole of said aldehyde of at least 3 carbon atoms are fed to said first reaction zone.

3. Process as set forth in claim 1 in which the residence time of the mixture in said first reaction zone is about 15 to 25 minutes.

4. Process as set forth in claim 1 in which the temperature in said second reaction zone is maintained substantially constant at about 105 to 110° C.

5. Process as set forth in claim 1 in which said aldehyde of at least three carbon atoms is propionaldehyde.

6. Process as set forth in claim 5 in which said amine salt is dimethylamine hydrochloride.

7. Process as set forth in claim 5 in which about 2 to 5 moles of said amine salt per mole of propionaldehyde are fed to said first reaction zone.

8. Process as set forth in claim 5 in which the residence time of the mixture in said first reaction zone is about 15 to 25 minutes.

9. Process as set forth in claim 8 in which said amine salt is dimethylamine hydrochloride, the amount of dimethylamine hydrochloride fed to said first reaction zone is about 2 to 5 moles per mole of propionaldehyde and in which the temperature in said second reaction zone is maintained substantially constant at about 105 to 110° C.

10. Process as set forth in claim 9 in which said reaction zones are maintained under an inert atmosphere.

11. Process as set forth in claim 1 in which said reaction zones are maintained under an inert atmosphere.

References Cited in the file of this patent
UNITED STATES PATENTS 2,639,295    Hagemeyer _____ May 19, 1953